(12) United States Patent
Jung (10) Patent No.: US 10,968,778 B2
(45) Date of Patent: Apr. 6, 2021

(54) GAS TURBINE

(71) Applicant: DOOSAN HEAVY INDUSTRIES & CONSTRUCTION CO., LTD., Changwon-si (KR)

(72) Inventor: Jin Sol Jung, Busan (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 196 days.

(21) Appl. No.: 16/011,639

(22) Filed: Jun. 19, 2018

(65) Prior Publication Data

US 2019/0093513 A1  Mar. 28, 2019

(30) Foreign Application Priority Data

Sep. 27, 2017 (KR) .................. 10-2017-0125159

(51) Int. Cl.
| | |
|---|---|
| F01D 25/28 | (2006.01) |
| F01D 25/26 | (2006.01) |
| F02C 7/20 | (2006.01) |
| F01D 25/16 | (2006.01) |
| F01D 5/14 | (2006.01) |

(52) U.S. Cl.
CPC .......... F01D 25/26 (2013.01); F01D 25/162 (2013.01); F01D 25/28 (2013.01); F02C 7/20 (2013.01); F01D 5/145 (2013.01); F05D 2220/32 (2013.01); F05D 2240/14 (2013.01); F05D 2250/314 (2013.01); F05D 2250/38 (2013.01); F05D 2260/30 (2013.01)

(58) Field of Classification Search
CPC ........ F01D 25/30; F01D 25/162; F01D 5/141; F01D 5/143
See application file for complete search history.

(56) References Cited

U.S. PATENT DOCUMENTS

| | | | |
|---|---|---|---|
| 2005/0172607 A1* | 8/2005 | Ishizaka | F01D 5/142 60/39.5 |
| 2012/0315136 A1* | 12/2012 | Sonoda | F04D 29/526 415/210.1 |
| 2014/0137533 A1* | 5/2014 | Subramaniyan | F01D 25/30 60/39.5 |
| 2014/0314542 A1 | 10/2014 | Hovhannisian | |

FOREIGN PATENT DOCUMENTS

JP  2012-202247 A  10/2012

OTHER PUBLICATIONS

A Korean Office Action dated Sep. 13, 2018 in connection with Korean Patent Application No. 10-2017-0125159 which corresponds to the above-referenced U.S. application.

* cited by examiner

*Primary Examiner* — Justin D Seabe
(74) *Attorney, Agent, or Firm* — INVENSTONE Patent, LLC (57) ABSTRACT

A gas turbine includes an outer casing having an annular shape; an inner casing disposed inside the outer casing; and a plurality of struts, each strut having a first end fixed to an outer surface of the inner casing, a second end fixed to an inner surface of the outer casing, and an inclined portion for guiding a flow of combustion gas, wherein the inclined portion is inclined from a front side to a rear side.

5 Claims, 9 Drawing Sheets

GAS TURBINE

CROSS REFERENCE TO RELATED APPLICATIONS

The present application claims priority to Korean Patent Application No. 10-2017-0125159, filed Sep. 27, 2017, the entire contents of which is incorporated herein for all purposes by this reference.

BACKGROUND OF THE DISCLOSURE

1. Field of the Disclosure

The present disclosure relates to a gas turbine having a strut having a structure being capable of minimizing separation of flue gas passing through the strut.

2. Description of the Background Art

Generally, a turbine refers to a rotary mechanical device that extracts energy from a fluid flow, such as water, vapor, air, or gas, and converts it into useful mechanical work. A turbine is a turbo-machine with at least one moving part, called a rotor assembly, which is a shaft with blades or vanes attached. Moving fluid is ejected to impact the blades or vanes and to cause a reaction force of the blades or vanes, which moves the rotor assembly at high speed.

Turbines are categorized into a hydro turbine using the potential energy of an elevated water source, a steam turbine using the thermal energy of vapor, an air turbine using pressure energy of high-pressure compressed air, and a gas turbine using energy of a high-temperature high-pressure gas.

Among them, the gas turbine includes a compressor, a combustor, and a rotor. The compressor includes a plurality of compressor vanes and a plurality of compressor blades disposed alternately with respect to each other.

The combustor supplies fuel to the compressed air compressed by the compressor and ignites the fuel-air mixture with a burner to produce high-temperature high-pressure combustion gas.

The turbine includes a plurality of turbine vanes and a plurality of turbine blades alternately arranged.

The rotor is arranged to pass through the centers of the compressor, the combustor, and the turbine. Both ends of the rotor are rotatably supported by bearings, and one end of the rotor is connected to a drive shaft of the generator.

The rotor includes a plurality of compressor rotor disks coupled with the compressor blades, a plurality of turbine rotor disks coupled with the turbine blades, and a torque tube transmitting torque from the turbine rotor disks to the compressor rotor disks.

In the gas turbine, the air compressed by the compressor is mixed with fuel and then combusted in the combustion chamber to produce high-temperature combustion gas which is in turn blown to the turbine. The combustion gas passes around the turbine blades and generates torque which in turn rotates the rotor.

This gas turbine does not include a reciprocating mechanism such as a piston, which is present in a typical four-stroke engine. Therefore, it has no mutually frictional parts such as a piston and cylinder, thereby consuming an extremely small amount of lubricating oil and reducing the operational amplitude unlike the reciprocating mechanism, which results in high speed operation.

The bearings rotatably support the rotor, and the bearings are supported by a bearing support structure whereby the bearings are fixed in the housing of the gas turbine. The bearing support includes an inner casing accommodating the bearings, an outer casing coupled to the housing, and struts extending from the outside surface of the inner casing to the inside surface of the outer casing.

In the case of the conventional gas turbine described above, the amount of thermal expansion or elongation of the support varies from component to component. Therefore, the bearing support has a problem of easily fracturing or being damaged.

Particularly, the struts that are directly exposed to a hot fluid (for example, combustion gas) experience a large amount of thermal expansion, but the outer casing experiences a smaller amount of thermal expansion than the struts because it is exposed to a low-temperature atmosphere. The inner casing also experiences a smaller amount of thermal expansion than the struts because cooling is provided for the inner casing to prevent deterioration of a lubricant for the bearings.

The thermal expansion of the struts is also suppressed due to the smaller thermal expansion of the inner casing and the outer casing. For this reason, the coupling points of the struts to the inner and outer casings, as well as the struts themselves, suffer a concentration of mechanical stress, which can result in damage to the support structure of the bearings.

In addition, there is a difficulty in designing the support structure and the rotor, such as to avoid resonance problems.

SUMMARY OF THE DISCLOSURE

According to one aspect of the present disclosure, there is provided a gas turbine including an outer casing having an annular shape; an inner casing disposed inside the outer casing; and a plurality of struts, each strut having a first end fixed to an outer surface of the inner casing, a second end fixed to an inner surface of the outer casing, and an inclined portion for guiding a flow of combustion gas, wherein the inclined portion is inclined toward a rear end from a front end of the strut.

The inclined portion may be formed such that a tip of the strut is inclined toward a trailing end from a leading end thereof.

The inclined portions of the struts all may have the same inclination angle.

The inclined portions of the struts may have different inclination angles.

The inclined portion of each of the struts may have an inclination angle corresponding to an inclination angle of an inclined portion 74 of a blade extending obliquely toward a trailing end from a leading end of a tip of a last blade positioned in front of the strut.

The inner surface of the outer casing may be inclined with the same slope as the inclined portion of the strut.

The inclination angle of each of the inclined portions may be an angle within a range of 5° to 30°.

The strut may include a gas contact surface extending from a leading edge to a trailing edge of the strut, the gas contact surface having a full length (TS) consisting of first, second, and third sections, each section corresponding to one third of the full length. The first section may start from the leading edge in a direction of the trailing edge, the second section may start from an end point of the first section, and the third section may range from an end point of the second section to the trailing edge. The strut may include a first inclined portion formed within the first section, and a second inclined portion formed within the second section and inclined toward the third section.

The first inclined portion and the second inclined portion may have different inclination angles.

The second inclined portion may have a larger inclination angle than the first inclined portion.

The strut may be positioned ahead of an axial intermediate position between the outer casing and the inner casing.

According to another aspect of the present disclosure, there is provided a gas turbine including an outer casing having an annular shape; an inner casing disposed inside the outer casing; and a plurality of struts, each strut having a first end fixed to an outer surface of the inner casing, a second end fixed to an inner surface of the outer casing, and an inclined portion for guiding a flow of combustion gas, wherein the inclined portion is inclined outward from a front end to a rear end of a tip of the strut, and the leading edge has an angle of attack that varies from a hub to the tip of the strut.

The strut may have a total length (S) and may include a first span (S1) starting from the hub and accounting for 20% of the total length; a second span (S2) starting from the tip and accounting for 20% of the total length; and a third span (S3) interposed between the first span and the second span.

The second span may have a longer length than each of the first and third spans.

The angle of attack may decrease from the first span to the second span and may increase from the second span to the third span.

The strut may be positioned such that the first span has a first inclination angle with respect to a flow direction of the combustion gas. The leading edge may be inclined in one direction.

The leading edge of the strut may be positioned such that the second span faces the flow direction of the combustion gas.

The strut may be positioned such that the third span has a second inclination angle with respect to the flow direction of the combustion gas. The leading edge may be inclined in one direction.

The first inclination angle may be an arbitrary angle within a range of 1° to 10°, and the second inclination angle may be an arbitrary angle within a range of 1° to 10°.

The strut may increase in thickness from the hub to the tip.

Embodiments of the present disclosure minimize a pressure loss and stabilize a fluid flow by minimizing flow separation of combustion gas passing by the struts.

According to the embodiments of the present disclosure, the shape of the strut can be locally differently optimized to stabilize the flow of combustion gas along the axial direction of the gas turbine.

The embodiments of the present disclosure can minimize the flow congestion of the combustion gas and improve the efficiency of the gas turbine.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Prior to describing embodiments of the present disclosure, the overall construction of a gas turbine will be briefly described with reference to FIG. 1.

Figure 1:
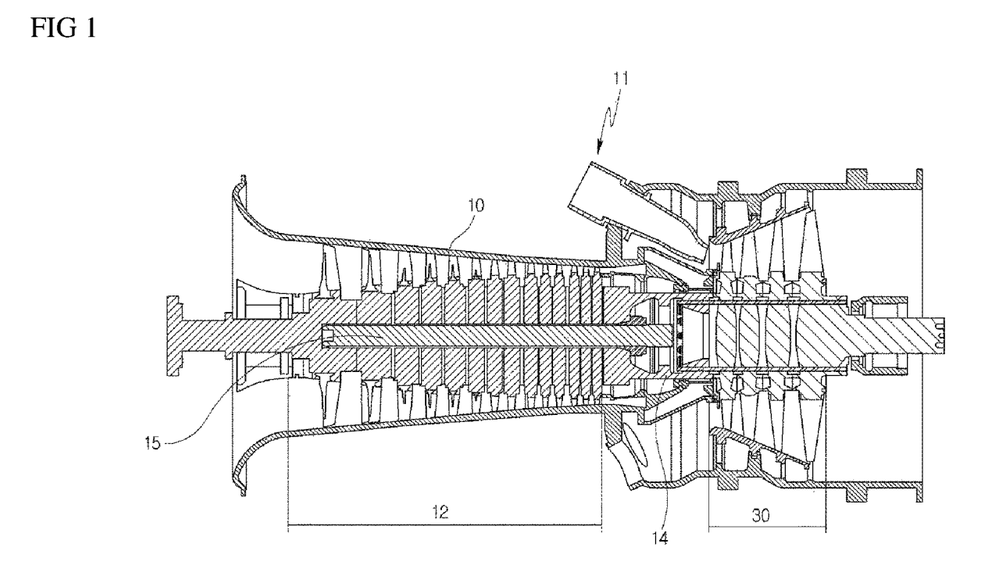
FIG. 1 is a cross-sectional view of a gas turbine according to one embodiment of the present disclosure.

Referring to FIG. 1, a gas turbine includes a casing 10 that is an outer shell of the gas turbine, and a diffuser into which combustion gas passing through a turbine enters is disposed at the rear side of the casing 10 (i.e., the right side of FIG. 1).

A combustor 11 that burns a mixture of fuel and compressed air is disposed in front of the diffuser.

In terms of a direction in which air flows, a compressor section 12 is disposed at the front side of the casing 10, and a turbine section 30 is disposed at the rear side of the casing 10.

A torque tube 14 for transmitting torque generated by the turbine section 30 to the compressor section 12 is installed between the compressor section 12 and the turbine section 40.

The compressor section 12 is provided with a plurality of (for example, fourteen) compressor rotor discs, and the compressor rotor discs are coupled by a tie rod 15 so as to not being spaced apart from each other in the axial direction.

The tie rod 15 passes through the center holes of the compressor rotor discs so that the compressor rotor discs are arranged in the axial direction. A flange is installed to protrude in the axial direction to be disposed near the periphery of the compressor rotor discs and is arranged not to perform a relative rotation with respect to the adjacent rotor discs.

The outer circumferential surface of each compressor rotor disc is coupled with a plurality of blades that is arranged in a circumferential direction of the compressor rotor disc. Each blade is provided with a dovetail portion, so that the blades are coupled to the compressor rotor disc in a dovetail connection manner.

For the dovetail connection, either a tangential entry type or an axial entry type may be used. Whether to use the tangential entry type or the axial entry type may be determined according to the structure of a gas turbine. Alternatively, the blades may be attached to the rotor disk in a different connection manner than the dovetail connection.

The tie rod 15 is arranged to pass through the center holes of the plurality of compressor rotor discs, in which one end thereof may be coupled the upstream end-side rotor disk and the other end may be fixed to the torque tube.

The shape of the tie rod may diversely vary according to the types of gas turbines. Therefore, it should be noted that the shape of the tie rod is not limited to the example illustrated in the drawings.

For example, a single tie rod may be provided and installed to pass through all of the center holes of the rotor discs. Alternatively, a plurality of tie rods may be arranged in a circumferential direction. Further alternatively, a complex type using both the single type and the multiple type may also be used.

Although not illustrated in the drawings, the compressor of the gas turbine may be provided with vanes serving as guide vanes at the position next to the diffuser, to control the flow angle of compressed fluid entering into the inlet of the combustor after passing through the compressor such that the actual flow angle matches with the designed flow angle. These vanes are referred to as a deswirler.

The combustor 11 mixes the compressed air with fuel and burns the air-fuel mixture to produce high-temperature high-pressure combustion gas. The combustion process is performed under constant pressure so that temperature of the combustion gas is increased to a heat-resistant temperature of the combustor and other parts of the gas turbine.

The combustors constituting the combustion section of the gas turbine may be provided in the form of a plurality of cells provided in respective casings. Each combustor includes a burner having fuel injection nozzles and the like, a combustor liner defining a combustion chamber, and a transition piece serving as a connection portion between the combustor and the turbine.

Particularly, the liner provides a combustion zone in which the fuel injected through the fuel nozzles and the compressed air supplied from the compressor are mixed and burned. In the combustor, the combustor liner encloses a combustion chamber in which a fuel and air mixture is combusted, and a flow sleeve surrounds the combustor liner to form an annulus space between the combustor liner and the flow sleeve. A fuel nozzle assembly is coupled to an upstream end of the combustor liner, and a spark igniter plug is installed in the flank surface of the combustor.

A transition piece is connected to a rear end (i.e., downstream end) of the combustor liner to deliver the combustion gas, produced in the combustion chamber after the flame is started by the spark igniter plug, to the turbine section.

Cooling the outer surface of the transition piece is performed to prevent the transition piece from being damaged by the high temperature combustion gas. The cooling is performed by forcing a portion of the compressed air supplied from the compressor to flow to the transition piece.

To this end, the transition piece is provided with cooling holes through which the compressed air is injected and then the air flows toward the combustor liner.

The air used for cooling the transition piece flows through around the annulus space provided between the combustor liner and the flow sleeve. In addition, a portion of the compressed air for cooling may be externally introduced through cooling holes formed in the flow sleeve and may be formed to flow along the outer surface of the combustor liner. Thus, the externally introduced cooling air and the air passing through the transition piece may meet in the annulus space.

The high-temperature, high-pressure combustion gas delivered to the turbine expands in the turbine, giving impulse to or causing reaction from the rotating blades of the turbine, thereby being turned into mechanical energy.

A portion of the mechanical energy generated by the turbine is supplied to the compressor so as to be used as energy to compress the air and the remainder is used to drive the generator to produce electric power.

In the turbine, a plurality of stator blades and a plurality of rotor blades are alternately arranged with a casing surrounding them. The combustion gas acts on and imparts rotary energy to the rotor blades, which in turn drives the output shaft to which the generator is connected.

To this end, the turbine section 30 includes a plurality of turbine rotor discs. Each turbine rotor disc has the substantially same shape as the compressor rotor disc.

The turbine rotor disk includes a plurality of turbine blades 33 arranged in a circumferential direction and attached thereto and a flange for coupling the corresponding turbine rotor disk to a neighboring turbine rotor disk. The turbine blades 33 may also be attached to the turbine rotor disk in a dovetail connection manner.

In the gas turbine having the structure described above, the intake air is compressed in the compressor section 12, burned in the combustor 11, then moved to the turbine section 30 to drive the turbine, and then discharged to the air via the diffuser.

A typical method for increasing the efficiency of the gas turbine is to raise the temperature of the gas flowing into the turbine section 30, but in this case, the inlet temperature of the turbine section 30 rises.

In addition, the turbine blades 33 provided in the turbine section 30 come into difficulty. That is, as the temperature of the turbine blades 33 locally rises, a thermal stress occurs. When the turbine blades 33 are exposed to the thermal stress for a long time, the turbine blades 33 may experience a creep phenomenon, resulting in failure of the turbine blades.

Struts provided in the gas turbine according to the first embodiment of the present disclosure will be described in more detail with reference to FIGS. 2 and 3.

Figure 2:
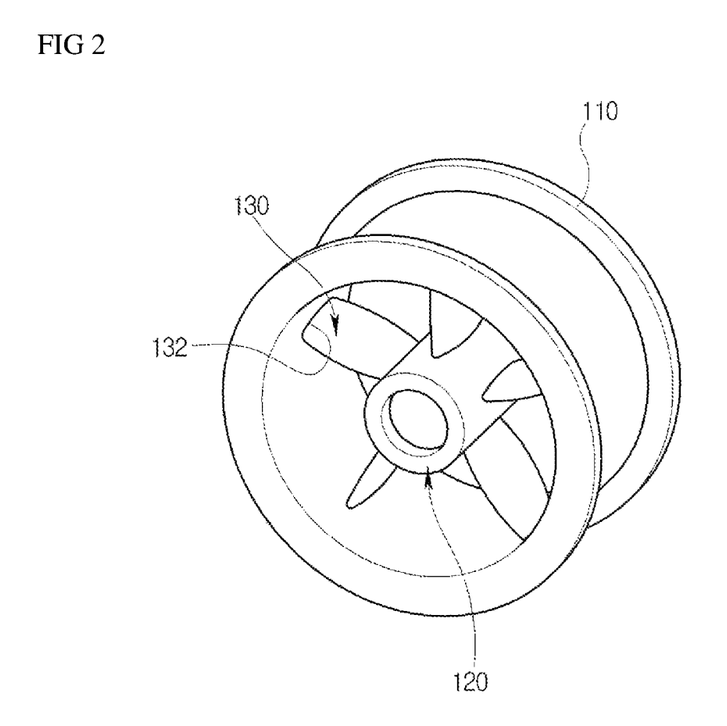
FIG. 2 is a perspective view of a strut of the gas turbine according to a first embodiment of the present disclosure.
Figure 3:
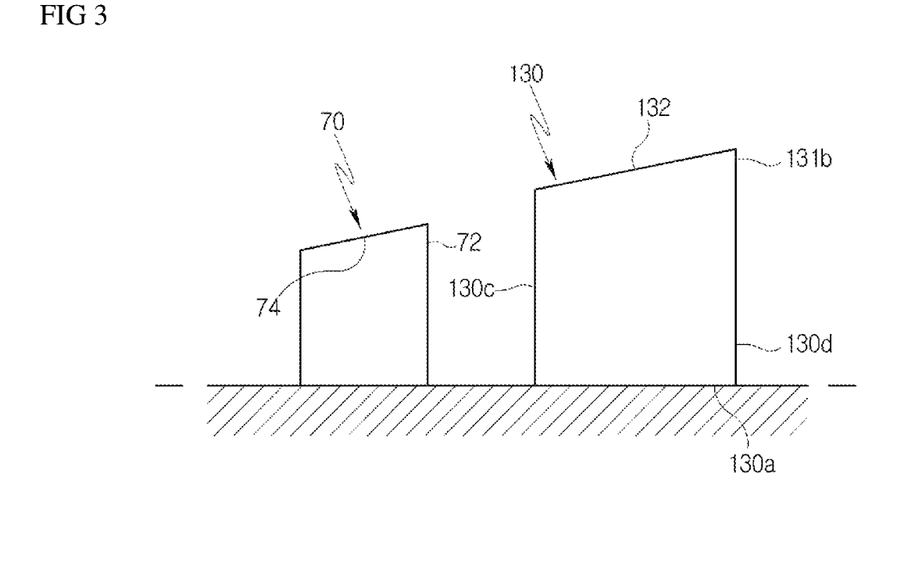
FIG. 3 is a schematic diagram of the strut according to the first embodiment of the present disclosure.

Referring to FIGS. 2 and 3, the gas turbine according to the first embodiment of the present disclosure includes a cylinder-shaped outer casing 110 having a predetermined thickness and length, and an inner casing 120 concentrically disposed inside the outer casing 110 and having a predetermined thickness and length.

The struts 130 are formed in the shape of an airfoil extending generally in the axial direction of the inner casing 120 and the outer casing 110, as shown in the drawings. Each of the struts 130 is provided between the outer casing 110 and the inner casing 120 and has opposite ends respectively fixed to the surface of the outer casing 110 and the surface of the inner casing 120.

The struts 130 are provided with inclined portions 132 that are inclined toward the rear sides of the struts to guide the movement of the combustion gas.

The inclined portion 132 is formed such that the tip 131b of the strut 130 is inclined outward (i.e., upward in the drawings) from the front end to the rear end of the tip 131b.

The inclined portion 132 is formed to reduce the occurrence of flow separation of the combustion gas moving along the surface of the strut 130 and to minimize unstable movement attributable to pressure loss.

The strut 130 prevents flow differential between the front end and the rear end when hot gas flows and minimizes flow separation when the hot gas flows along the surface of the strut 130. It is undesirable desirable that the flow is locally unstable on the surface of the strut 130. According to the present embodiment, since it is possible to reduce flow separation at the front end, it is possible to suppress aerodynamic losses attributable to additional flow separation at the rear end.

Also, when the hot gas moves along the surface of the strut 130, the phenomenon of flow separation is reduced while the hot gas passes by the inclined portion 132. Therefore, it is possible to minimize problems caused by pressure loss and flow separation near the multiple struts.

Preferably, the strut 130 according to the present embodiment reduces the pressure loss attributable to flow separation at the leading edge 130c when the combustion gas moves from the leading edge 130c to the trailing edge 130d. That is, the present embodiment intends to maintain the constant pressure even at the trailing edge 130d when cooling air moves, thereby guiding the stable flow of the combustion gas on the surface of the strut 130.

In the inclined portion 132 according to the present embodiment, the multiple struts 130 all have the same inclination angle. When the combustion gas moves by the strut 130, the flow speed and the flow rate vary slightly depending on positions. However, when the same inclination angle of the struts is maintained, the pressure fluctuations according to positions can be minimized.

In another embodiment, the inclined portions 132 of the struts 130 have different inclination angles. In this embodiment, when the struts 130 are concentrically arranged in a circumferential direction with respect to the center of the inner casing 120, the inclined portions of the struts 130 are set to have different inclination angles according to their positions. Particularly, at the position where unstable flow of the combustion gas occurs, the inclination angle of the inclined portion 132 of the strut is changed to minimize the flow separation on the surface of the strut 130.

The inclined portion 132 according to the present embodiment may have an inclination angle corresponding to an inclination angle of an inclined portion 74 of a blade extending obliquely toward the rear end from the front end at the tip 72 of the last blade 70 positioned in front of the strut 130.

For example, the last blade 70 is a four-stage blade. The combustion gas moves along the surface of the last blade 70 and subsequently moves to the strut 130. When the combustion gas moves along the surface of the strut 130 after passing through the last blade 70, in the case where the inclination angle of the inclined portion 74 of the blade and the inclination angle of the inclined portion 132 of the strut 130 are the same or similar, the flow separation at the leading edge 130c of the strut 130 can be reduced.

Therefore, the flow stability of the hot gas is improved, the aerodynamic performance is improved, and the vortex caused by the pressure drop is minimized.

The inner surface of the outer casing 110 according to the present embodiment is inclined by the same inclination as the inclination angle of the inclined portion 132 of the strut 130. The outer casing 110 is connected to the tip 131b of the strut 130. When the inner surface of the outer casing 110 obliquely extends with an inclination, the cooling air moving along the surface of the strut 130 does not experience flow separation while it moves through a space formed between the tip 131b of the strut 130 and the inner surface of the outer casing 110. Therefore, the cooling air does not experience flow separation and can move to the trailing edge with a minimum pressure loss.

The inclination angle of the inclined portion 132 may be, for example, any angle within an angle range of 5° to 30°. When the inclination angle of the inclined portion 132 is maintained at 5° or more, the above-described effect can be obtained at the time of movement of the cooling air.

Also, since the inclined portion 132 is inclined at an inclination angle of not greater than 30°, undesired flow separation of the cooling air can be minimized.

Figure 4:
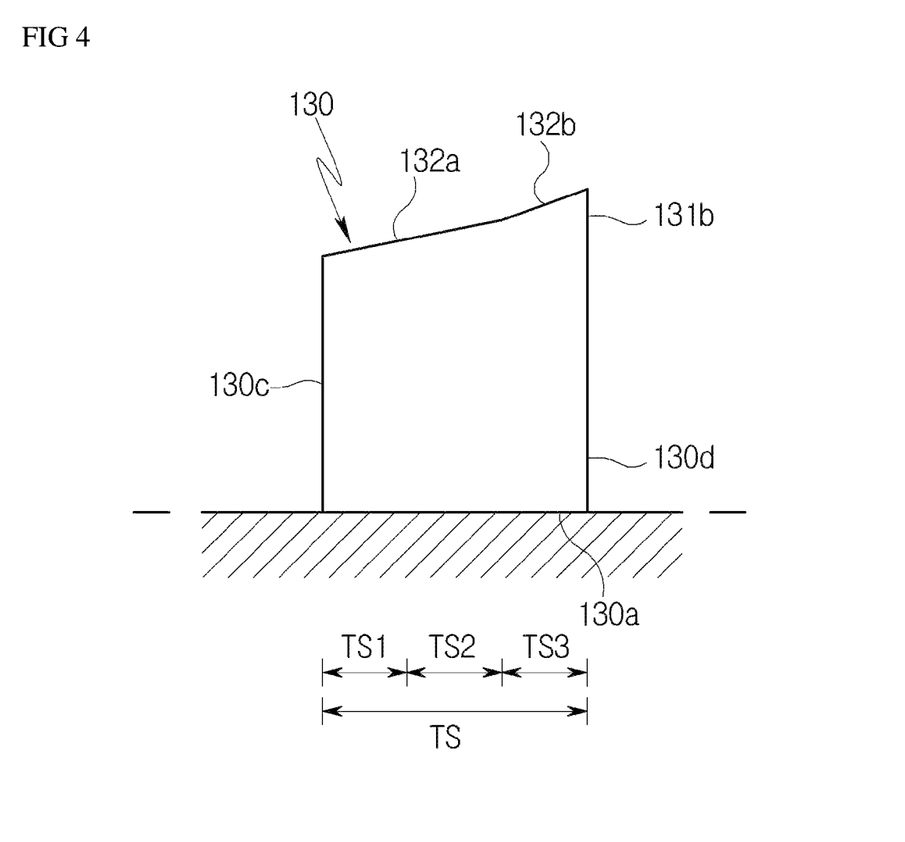
FIG. 4 is a schematic diagram of a second inclined portion provided to the strut according to the first embodiment of the present disclosure.

Referring to FIG. 4, it is assumed that the strut 130 according to the present embodiment comes into contact with combustion gas, and the entire length from the leading edge 130c formed at the front end to a trailing edge 130d formed at the rear end of the strut 130 is referred to as a total section (TS).

The first one-third of the total section TS of the strut 130, starting from the leading edge 130c in the direction of the trailing edge 130d, is referred to as a first section TS1; the next one-third of the total section TS of the strut 130 starting from an end point of the first section TS1 is referred to as a second section TS2; and the last one-third of the total section TS of the strut 130, ranging from an end point of the second section TS2 to the trailing edge 130d, is referred to as a third section TS3. The strut 130 may have a first inclined portion 132a formed within the first section TS1 and a second inclined portion 132b formed within the second section and inclined toward the third section TS3.

In this embodiment, the strut has two inclined portions rather than one inclined portion. When the size of the strut 130 is increased, this configuration (i.e., having two or more inclined portions) is advantageous in terms of securing stable flow of the cooling air. However, even when the strut 130 is small, the strut 130 may have the above-described configuration for securing a more stabilized fluid flow.

The first inclined portion 132a and the second inclined portion 132b may be inclined at different inclination angles. In this case, the inclination angle of the second inclined portion 132b is greater than that of the first inclined portion 132a.

The cooling air is caused to move along the surface of the first section TS1 by being guided by the inclination angle of the first inclined portion 132a of the strut 130. The first section TS1 is a section in which the surface bending change of the surface is relatively small compared to the second section TS2.

The second section TS is a section in which the surface bending change is greater than the first section TS1. The second inclined portion 132b is formed such that the cooling air can stably move along the surface of the second section TS2.

The second inclined portion 132b induces the cooling air to move outward after passing through the first inclined portion 132a, thereby minimizing the occurrence of flow separation and minimizing turbulent flow attributable to the pressure loss.

For this, the inclination angle of the second inclined portion 132b is larger than the inclination angle of the first inclined portion 132a, so that the flow of the combustion gas can be stabilized.

Figure 5:
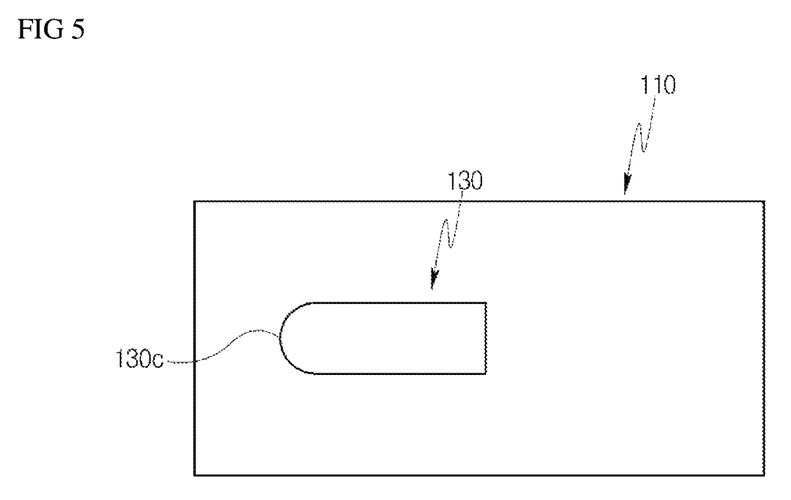
FIG. 5 is a plan view of the strut according to the first embodiment of the present disclosure.

Referring to FIG. 5, the strut 130 is positioned ahead of the axial medial position between the outer casing 110 and the inner casing 120.

The reason that the strut 130 is positioned in the aforementioned position is to stabilize the initial flow of the flue gas through the area between the outer casing 110 and the inner casing 120.

Thus, the flow of flue gas is maintained while suppressing the flow separation during and after passing through the strut 130.

A gas turbine according to a second embodiment of the present invention will be described with reference to FIGS. 6 to 9.

Referring to FIGS. 6 to 9, according to the second embodiment, the gas turbine includes an outer casing 110 having an annular shape, an inner casing 120 disposed inside the outer casing, and a plurality of struts 130, each having a first end and a second end fixed to an outer surface of the inner casing 120 and an inner surface of the outer casing 110, respectively, in which each strut 130 has an inclined portion 132 at a tip 131b thereof, the inclined portion 132 being inclined outward from a leading end to a trailing end of the tip 131b, and in which an angle of attack of a leading edge 130c of the strut 130 varies over the entire span S of the strut 130, which ranges from a hub 130a to the tip 131b.

In this embodiment, the angle of attack of the strut 130 can be changed to induce an optimum flow of the combustion gas according to the position, thereby minimizing flow separation of the combustion gas.

Figure 6:
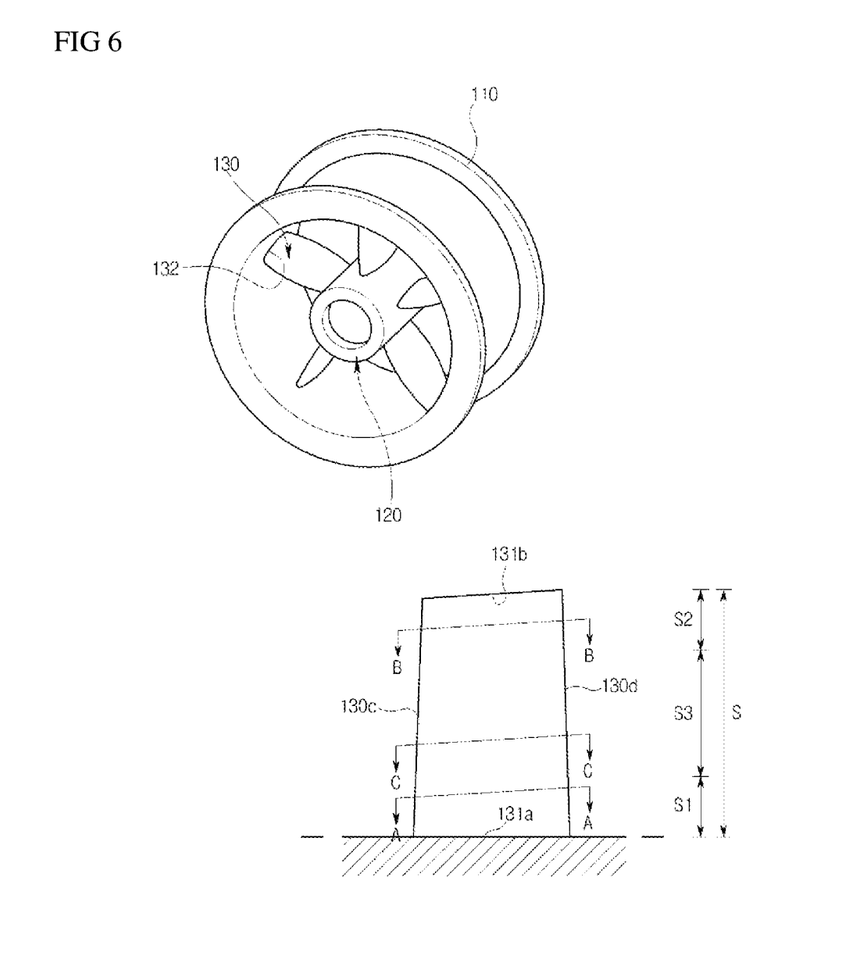
FIG. 6 is a schematic diagram of the strut according to a second embodiment of the present disclosure, in which the strut is segmented into a first span, a second span, and a third span.

The entire span S of the strut 130, ranging from the hub 130a to the tip 130b, consists of a first span S1 starting from the hub 130a and accounting for 20% of the entire span S, assuming that the total length of the entire span S is 100%, a third span S2 starting from the tip 131b and accounting for 20% of the entire span S; and a second span S2 formed between the first span S1 and the third span S3.

The first to third spans S1, S2, and S3 have different angles of attack to improve the stability of flow depending on the position of the combustion gas flowing along the surface of the strut 130. The angle of attack refers to the angle between the inflow direction of the combustion gas and the chord line of the strut 130 when the combustion gas flows toward the leading edge 130c of the strut 130.

As the angle of attack increases, a positive force of the strut 130 increases. In other words, as the angle of attack decreases, the positive force of the strut 130 decreases. The resistance of the combustion gas is proportional to the angle of attack.

Figure 7:
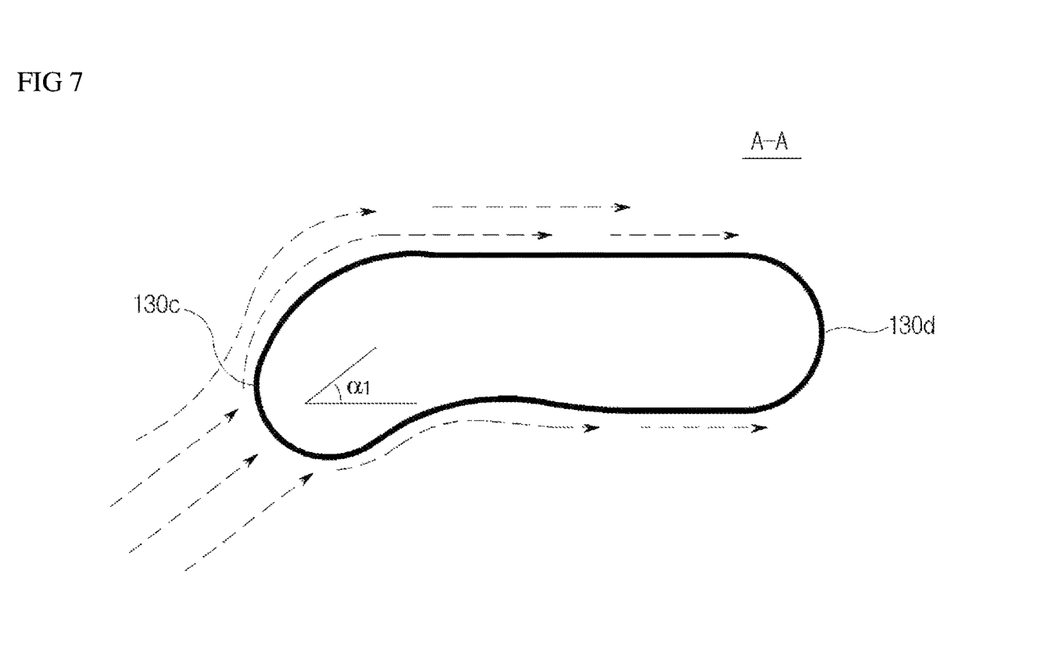
FIG. 7 is a cross-sectional view taken along a line A-A of FIG. 6.
Figure 8:
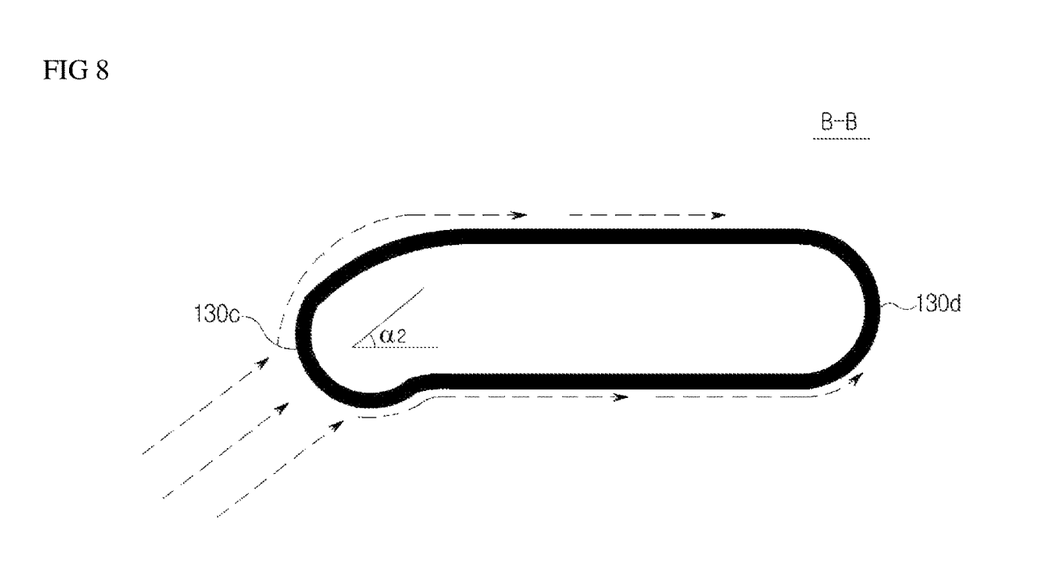
FIG. 8 is a cross-sectional view taken along a line B-B of FIG. 6.
Figure 9:
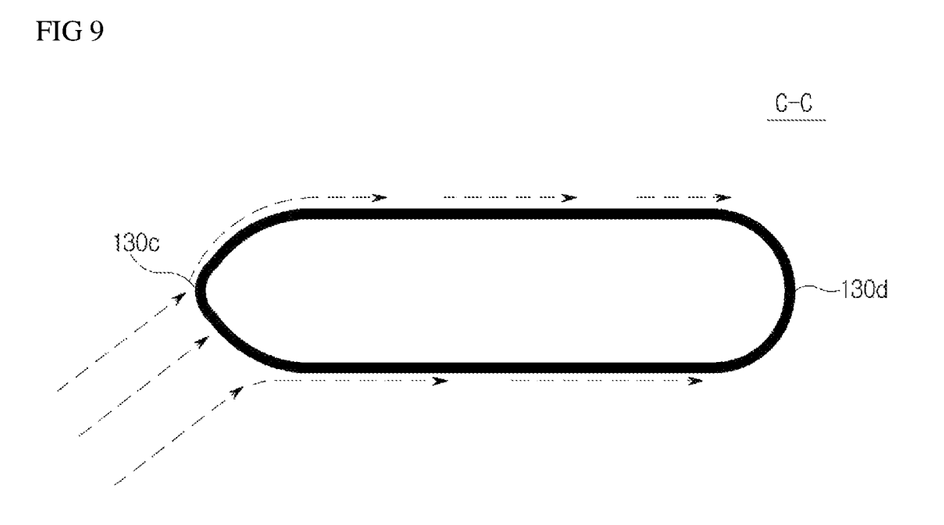
FIG. 9 is a cross-sectional view taken along a line C-C of FIG. 6.

The strut 130 has a cross-sectional shape, as illustrated in the drawings, at a specific position among the first to third spans S1 to S3. More particularly, the angle of attack of the leading edge 130c gradually decreases toward the second span S2 from the first span S1.

It is desirable that the positive force is increased within the first span S1 of the strut 130. The flow velocity of the combustion gas in the first span S1 is less than that in the third span S3.

The combustion gas flows from the leading edge 130c to the trailing edge 130d, simultaneously passing by the first span S1, the second span S2, and the third S3. Therefore, the stable flow in each of the first to third spans S1, S2, and S3 is very important.

Particularly, when the combustion gas passes by the first to third spans S1, S2, and S3, the flow stability is improved when the combustion gas flows closely to the surface of the strut until reaching the trailing edge 130d without being separated from the surface. Therefore, it is preferable that the strut 130 has a configuration in which the angle of attack at the leading edge varies from partial span to partial span.

The second span S2 has a longer length than each of the first and third spans S1 and S3. When each of the first and third spans S1 and S3 is longer than the second span S2, the flow of the combustion gas may become unstable.

Therefore, according to the present disclosure, the second span S2 is designed to be longer than the first and third spans S1 and S3, both of the straight advancing and the flow stability of the combustion gas are maintained.

In this embodiment, the angle of attack decreases from the first span S1 to the second span S2, and then the angle of attack increases from the second span S2 to the third span S3. The reason for this configuration is that when the combustion gas flows along the strut 130, it is possible to reduce the flow separation, to prevent the separation attributable to the pressure drop, and to minimize the flow congestion.

The strut 130 is positioned such that the first span S1 has a first inclination angle α1 with respect to a direction in which the combustion gas moves, and the leading edge 130c is inclined in one direction.

The first inclination angle α1 is maintained at 10°, for example, but is not necessarily limited to the above-described angle.

The leading edge 130c of the strut 130 is positioned such that the second span S2 faces the direction in which the combustion gas flows. In this case, the combustion gas adheres to the surface of the strut 130 and stably flows from the leading edge 130c to the trailing edge 130d.

The strut 130 is positioned such that the third span S3 has a second inclination angle α2 with respect to the direction in which the combustion gas moves and the leading edge 130c is inclined in one direction.

The second inclination angle α2 is maintained at −10°, for example, but is not necessarily limited to the above-described angle.

The first inclination angle α1 and the second inclination angle α2 are an arbitrary inclination within a range of from 1° to 10°, in which the absolute values of the first and second inclination angles α1 and α2 may be the same but the inclined directions thereof may be opposite.

The strut 130 increases in thickness from the hub 130a to the tip 130b. The strut 130 is designed to have such a thickness gradient due to the structural strength, which can improve stability and durability for long-term use.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A gas turbine comprising:
   an outer casing having an annular shape and an axial center line;
   an inner casing concentrically disposed inside the outer casing; and
   a plurality of struts disposed between the inner and outer casings, each of the plurality of struts including:
      a hub end fixed to an outer surface of the inner casing,
      a tip end fixed to an inner surface of the outer casing, and
      a strut tip for guiding a flow of combustion gas, the strut tip including a leading end disposed at a leading edge of the strut and a trailing end disposed at a trailing edge of the strut, the strut tip extending radially outward in a downstream direction and further including:
         a first inclined portion that is disposed at the leading end of the strut tip and forms a first inclination angle with the axial center line, and
         a second inclined portion that is disposed at the trailing end of the strut tip and forms a second inclination angle with the axial center line,
      wherein the first inclined portion and the second inclined portion have different inclination angles, and
      wherein the second inclination angle is greater than the first inclination angle.

2. The gas turbine according to claim 1,
wherein the plurality of struts are concentrically arranged in a circumferential direction with respect to a center of the inner casing.

3. The gas turbine according to claim 1, wherein each of the first and second inclination angles is within a range of 5° to 30°.

4. The gas turbine according to claim 1,
wherein each of the plurality of struts includes a gas contact surface extending from the leading edge to the trailing edge, the gas contact surface having a full length (TS) consisting of first, second, and third sections, each section corresponding to one third of the full length,
wherein the first section starts from the leading edge in a direction of the trailing edge, the second section starts from an end point of the first section, and the third section ranges from an end point of the second section to the trailing edge, and
wherein the first inclined portion of each of the plurality of struts is formed within the first and second sections, and the second inclined portion of each of the plurality of struts is formed within the third section.

5. The gas turbine according to claim 1, wherein each of the plurality of struts is entirely disposed upstream of an axially medial position, between the outer casing and the inner casing.

* * * * *